United States Patent
Mohammadzadeh Fadaki et al.

(10) Patent No.: US 11,627,829 B1
(45) Date of Patent: Apr. 18, 2023

(54) BEVERAGE CREATION DEVICE

(71) Applicant: Minfusion Inc., Richmond Hill (CA)

(72) Inventors: Reza Mohammadzadeh Fadaki, Richmond Hill (CA); Mehrdad Iranshahi, Karaj (IR); Kazem Rezaei, Richmond Hill (CA); Sima Sokhanvaran, Mashhad (IR); Mojtaba Falahatinezhad, Vaughan (CA); Sayedsajjad Tabatabaei Nasrabadi, Isfahan (IR)

( * ) Notice: Subject to any disclaimer, the term of this patent is extended or adjusted under 35 U.S.C. 154(b) by 0 days.

(21) Appl. No.: 17/824,731

(22) Filed: May 25, 2022

(51) Int. Cl.
| | |
|---|---|
| A47J 31/40 | (2006.01) |
| A47J 31/60 | (2006.01) |
| B01F 23/236 | (2022.01) |
| A47J 31/52 | (2006.01) |
| B01F 23/232 | (2022.01) |
| C02F 1/68 | (2023.01) |
| B01F 101/14 | (2022.01) |

(52) U.S. Cl.
CPC ............ A47J 31/404 (2013.01); A47J 31/52 (2013.01); A47J 31/605 (2013.01); B01F 23/232 (2022.01); B01F 23/2363 (2022.01); C02F 1/687 (2013.01); *B01F 2101/14* (2022.01)

(58) Field of Classification Search
CPC ........ A47J 31/06–605; A47J 31/52–525; A47J 31/404; A47J 31/401; A47J 31/40; B01F 23/238; B01F 23/50; B01F 23/2363; B01F 23/232; B01F 2101/14; C02F 1/687
USPC ......... 99/323, 323.3, 323.1–323.2, 316, 309, 99/304–305, 297, 289 R, 287, 280, 291
See application file for complete search history.

(56) References Cited

U.S. PATENT DOCUMENTS

| | | | |
|---|---|---|---|
| 11,383,965 B1* | 7/2022 | Springer | A47J 31/40 |
| 2004/0123747 A1* | 7/2004 | Lassota | A47J 31/42 |
| | | | 99/510 |
| 2006/0157463 A1* | 7/2006 | Wiele | A47J 31/40 |
| | | | 219/214 |

(Continued)

OTHER PUBLICATIONS

Non-Patent Literature to Tier 1, "About Tier 1" (Year: 2020).*
Wayback Machine for Tier 1 (Year: 2020).*

*Primary Examiner* — Tu B Hoang
*Assistant Examiner* — Bonita Khlok
(74) *Attorney, Agent, or Firm* — Nasser Ashgriz; UIPatent Inc.

(57) ABSTRACT

The present invention is a beverage creation device that motivates water consumption, eliminates water bottles, provides minerals and vitamins and tracks the minerals and vitamins intake during a day or a specific period of time. The beverage creation device comprises of several unique features to provide filtered water with vitamins, minerals, flavours and different levels of carbonation and also track and notify the user about the amount of consumption during a day or a period of time to make sure the necessary vitamins and minerals are received by the users. The novel dosing system divides vitamins, minerals and flavor contents into multiple separate dose formulations to be taken separately at different times to exclude or reduce the interactions and effectiveness and adds a specific amount of each one of the multiple separate dose formulations to the filtered water in a specific amount based on specific parameters being age, intake nutrition and doctor prescription.

10 Claims, 20 Drawing Sheets

(56) References Cited

U.S. PATENT DOCUMENTS

| | | | | |
|---|---|---|---|---|
| 2011/0052764 | A1* | 3/2011 | Bulgin | A47J 31/404 |
| | | | | 700/285 |
| 2017/0079469 | A1* | 3/2017 | Apone | B67D 1/0009 |
| 2017/0251709 | A1* | 9/2017 | Jetton | B65B 3/12 |
| 2021/0017010 | A1* | 1/2021 | Funke | B67D 1/0032 |
| 2021/0093120 | A1* | 4/2021 | Palmer | A47J 31/34 |
| 2021/0315411 | A1* | 10/2021 | Burrows | A47J 31/3695 |

* cited by examiner

BEVERAGE CREATION DEVICE

FIELD OF THE INVENTION

The present invention relates in general to a beverage creation device and in particular to a beverage creation device that purifies tab water, adds quantitative minerals, vitamins and flavour to the filtered water and carbonates the mixture of filtered water, minerals, vitamins and flavour.

BACKGROUND OF THE INVENTION

There are several benefits for drinking water. Drinking water helps maintain the balance of body fluids, controls calories, energizes muscles, boosts skin health and beauty, maintains normal bowel function, lubricates the joints, forms saliva and mucus, delivers oxygen throughout the body, cushions the brain, spinal cord, and other sensitive tissues, regulates body temperature, flushes body waste and helps maintain blood pressure. Water makes minerals and nutrients accessible.

Due to water contamination, water filtering means are widely known and used in numerous applications. By advance technology for purification of the drinking water, it is a good practice for humans to drink filtered water instead of a tab water. Each filtration and/or purification process has different abilities and inabilities of removing the contaminants and minerals from the water.

Consumption of bottled water is increasing by ten percent every year worldwide, and the United States (U.S.) is the largest consumer market for bottled water in the world. The bottled water industry is harmful to the environment. Nearly 80 percent of plastic water bottles simply become litter in landfill, creating two million tons of plastic bottle waste every year.

Minerals are essential for humans because the organism cannot produce them, so it is necessary for humans a regular amount of minerals intake from foods and water. The availability of minerals from food is less than mineral water, because in foods minerals are bound to complex molecules that can limit their absorbability, instead in water they are present as free ion.

Approximately one billion people worldwide are deficient in at least one vitamin or mineral (also known of micronutrients). Iron, vitamin A, zinc and iodine deficiencies are very frequent among children of preschool (aged 24 months to less than 5 years) and school age (5 to 12 years of age), limiting their health and daily physical performance. Point-of-use enrichment with powdered vitamins and minerals has been proposed to reduce micronutrient deficiencies in children. The study found that children receiving iron-containing MNP (Micronutrient Powder) at point-of-use enrichment of foods were at significantly lower risk of having anaemia and iron deficiency and had higher haemoglobin concentrations.

Dietary supplements come in a variety of forms, including tablets, capsules, gummies, and powders, as well as drinks and energy bars. Vitamins and minerals continue to be the most commonly consumed supplement category. 77 percent of U.S. adults take vitamins and dietary supplements. Among all the age groups, adults between the ages 35-54 have the highest usage of dietary supplements at 81 percent. The dietary supplements industry continues to innovate, there is no denying that these regulated products have become mainstream. In addition to vitamins, dietary supplements contain minerals, herbs or other botanicals, amino acids, enzymes, and many other ingredients. Popular supplements include vitamins D and B12 and minerals like calcium and iron.

Vitamin-mineral compositions usually have several vitamins and minerals in a single dose formulation. For example, it may contain 19 components comprising 12 vitamins or vitamin-like substances (A, E, C, B1, B5, B6, B9, B12, riboflavin, nicotinamide and lipoic acid) and 7 minerals (iron, copper, calcium, cobalt, manganese, zinc, and magnesium). The disadvantage of this composition is the lack of compatibility between some of its components, either during long-term storage or during absorption into the body.

In vitamin-mineral compositions, some components interfere with the activity of other components. It is known that zinc reduces uptake of copper and compete with iron and calcium in absorption. Furthermore, iron and calcium reduce the uptake of manganese. Thus, combining all these minerals into one dose formulation is not a reasonable approach to the delivery of minerals. In order to still meet the daily requirement of the body in this type of formulation, the amount of the minerals in the dosage formulation needs to be increased. Dividing the vitamins and minerals between just two separate dose formulations is inadequate to effectively eliminate negative interactions among the vitamins and minerals.

Vitamins and minerals can interact with each other while being produced, stored, absorbed, or acting within the body. Thus, they need to be divided into three to five dose formulations having different vitamin-mineral contents. These different, separate dose formulations are taken separately at different times to exclude or reduce these interactions and to avoid reduced effectiveness.

The vitamins and minerals dose consumption are also different for the users by their age and their food consumption preferences. The cumbersome for modern life are that people usually forget to take their vitamins and supplements, the efficiency of the vitamins and supplements are variable based on the components interfere with each other's while being produced, stored, absorbed, or acting within the body, and also point-of-use enrichment is not taken into consideration. The best way to introduce the minerals and vitamins to the daily life is to have them combined in the daily behaviour.

SUMMARY OF THE INVENTION

The present invention discloses a beverage creation device comprising of several unique features to provide filtered water with vitamins, minerals, flavours and different levels of carbonation and also tracks and notifies the user about the amount of consumption during a day or a period of time to make sure the necessary vitamins and minerals are received by the users.

The present invention comprises of several modules:
  a) a water supply module having a water inlet valve that connects to a tab water to regulate a water flow into a filtration module;
  b) a pre-mixing chamber to mix a set of powders of minerals, vitamins and flavours with a filtered water;
  c) a powder dispenser module having a set of powder dispensers placed above the pre-mixing chamber;
  d) each powder dispenser, comprising:
  i. a powder container feeding a powder chamber, wherein the powder chamber has a hopper that has an opening, ii. a stopper mechanism to open and close the opening of the hopper,
iii. wherein the stopper mechanism comprising:
   a stopper rod extending upwardly from a center of a spring-loaded bottom plate to enter into and close the opening of the hopper;
   a set of push-rods extending upwardly from a perimeter of the spring-loaded bottom plate;
   a set of actuators to symmetrically push on the set of push-rods to open the opening and prevent tilting of the bottom plate, whereby once the set of actuators are off, the spring-loaded bottom plate pushes the stopper rod upward to close the opening of the hopper;
e) a vibration mechanism connected to the set of powder dispensers to facilitate powder flow in the hopper;
f) a controller to receive a set of inputs by a user wherein the set of inputs comprising of a desired daily amount of a set of powders.

As vitamins and minerals can interact with each other while being produced, stored, absorbed, or acting within the body, the present invention provides them to the consumer at the point-of-use. In the present invention, the vitamins and minerals are divided into three to five dose formulations with different vitamin-mineral contents. These different separate dose formulations are taken separately at different times to exclude or reduce the interactions and to avoid reduced effectiveness.

For example, in one embodiment in the present invention 13 vitamins and 10 minerals are divided into 3 dose formulations to be taken at different times over a 24-hour period:
A first dose formulation contains: vitamins A, C, and E and magnesium, manganese, selenium, and zinc.
A second dose formulation contains: vitamins B2, B5, B6, B9, B12, D3, K, and biotin (H) and chromium and calcium.
A third dose formulation contains: vitamins B1, B3, and B6 plus iron, copper, molybdenum, and iodine.

A specific amount of each one of these formulations can be added to the filtered water in a specific amount based on the age, activity and the intake nutrition.

The beverage creation device of the present invention can provide a customized beverage for a user. The information about the amount of vitamins, minerals which the user should take during a day can be stored and retrieved from the control panel of the device.

An assessment can be done by the user or another person (a nutritionist or a doctor) to reply to a questionnaire to come up with vitamins and minerals dose consumption. The result can be presented to the device by a numeric code, QR code or any transferable means for transferring data to the device.

The beverage creation device of the present invention provides a customized beverage for each member of a household or each customer which have access to the device. The user may prefer different types of water and different recipes for vitamins, minerals and flavored beverages and different levels of carbonation.

In order to allow automated beverage creation, certain powder dispenser system have been developed which possess ability for "micro-dosing" a very small amounts of powder with great precision, speed, and reliability. The method facilitates the control and automation of dispensation of a powder to achieve a level of dispensing precision that can be acceptable for at least some substances (minerals and vitamins); and adapting the technology for prescription-specific operability for producing customized dose formulation for minerals and vitamins.

It is therefore an object of the present invention to provide a beverage creation device that can provide filtered water with vitamins, minerals, flavour and different levels of carbonation beverages and track and notify the user about the amount of consumption during a day or a period of time to make sure the necessary vitamins and minerals are received by the users.

It is another object of the present invention to reduce travel time to store to buy water bottles, vitamins, supplements and other beverages and reducing billions of water bottles consumed in the market.

It is another object of the present invention to provide a beverage creation device which allows a user to create beverages with tap water to be filtered, enriched, flavored, and carbonated to the user's preferences.

It is another object of the present invention to provide a beverage creation device which is less cumbersome, easy to use, substantially low-cost filter system and method that efficiently filters and purifies water, provides specific minerals, vitamins and flavours to the consumers along with their daily activity.

BRIEF DESCRIPTION OF THE DRAWINGS

Embodiments herein will hereinafter be described in conjunction with the appended drawings provided to illustrate and not to limit the scope of the claims, wherein like designations denote like elements, and in which:

DETAILED DESCRIPTION OF PREFERRED EMBODIMENTS

Figure 1A:
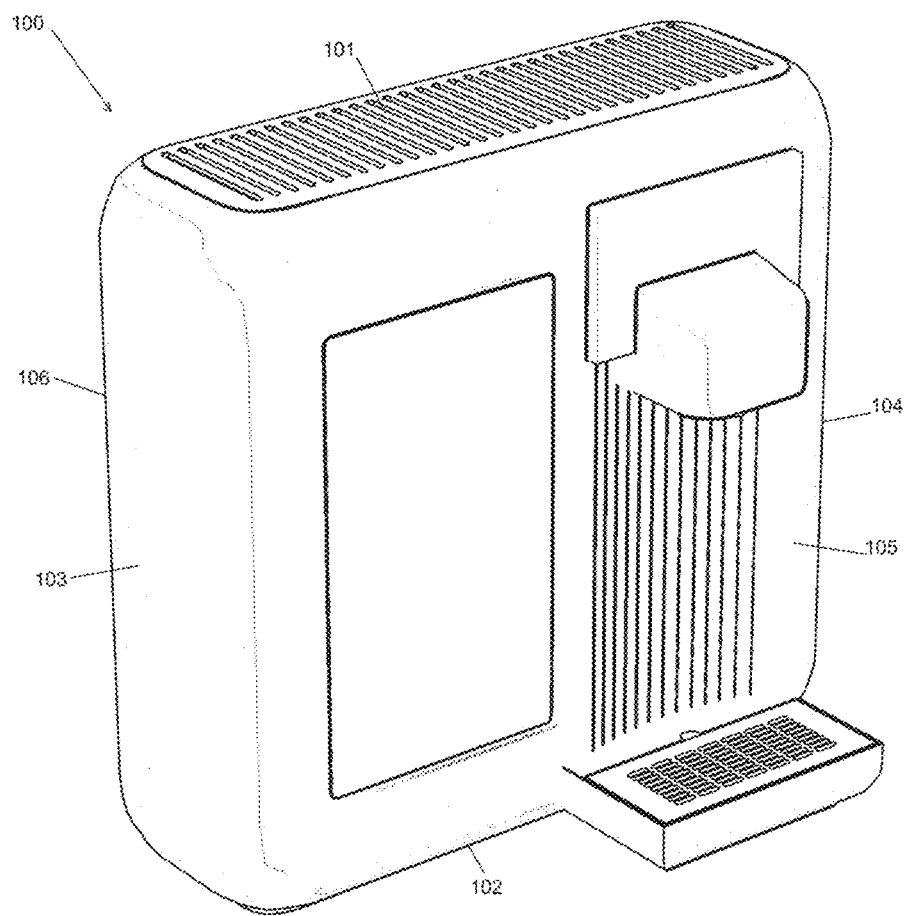
FIG. 1A shows a perspective view of the beverage creation device of the present invention.

FIGS. 1A, 1B, 1C and 1D show a perspective view, a front view, a side view and a top view of the present invention 100. The present invention is a beverage creation device 100 that has a top part 101 and a bottom part 102, two side walls 103-104 and a front portion 105 and a back portion 106. The user can access inside the device 100 from the top part 101.

Figure 2:
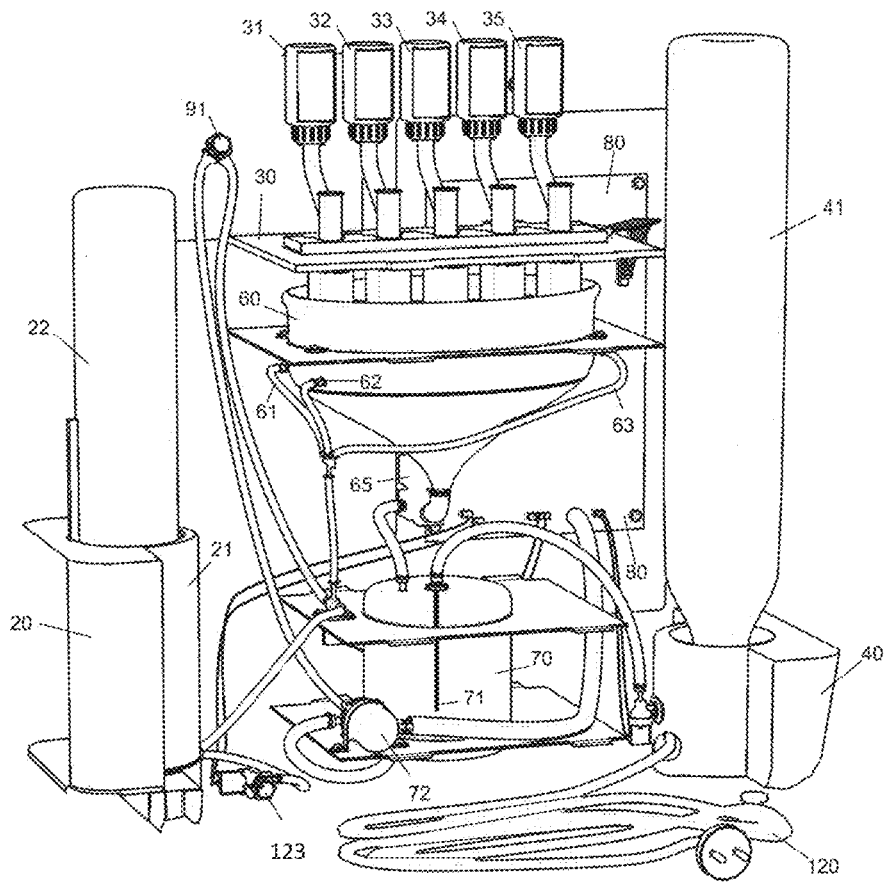
FIG. 2 shows a perspective view of all modules in the beverage creation device of the present invention.
Figure 3:
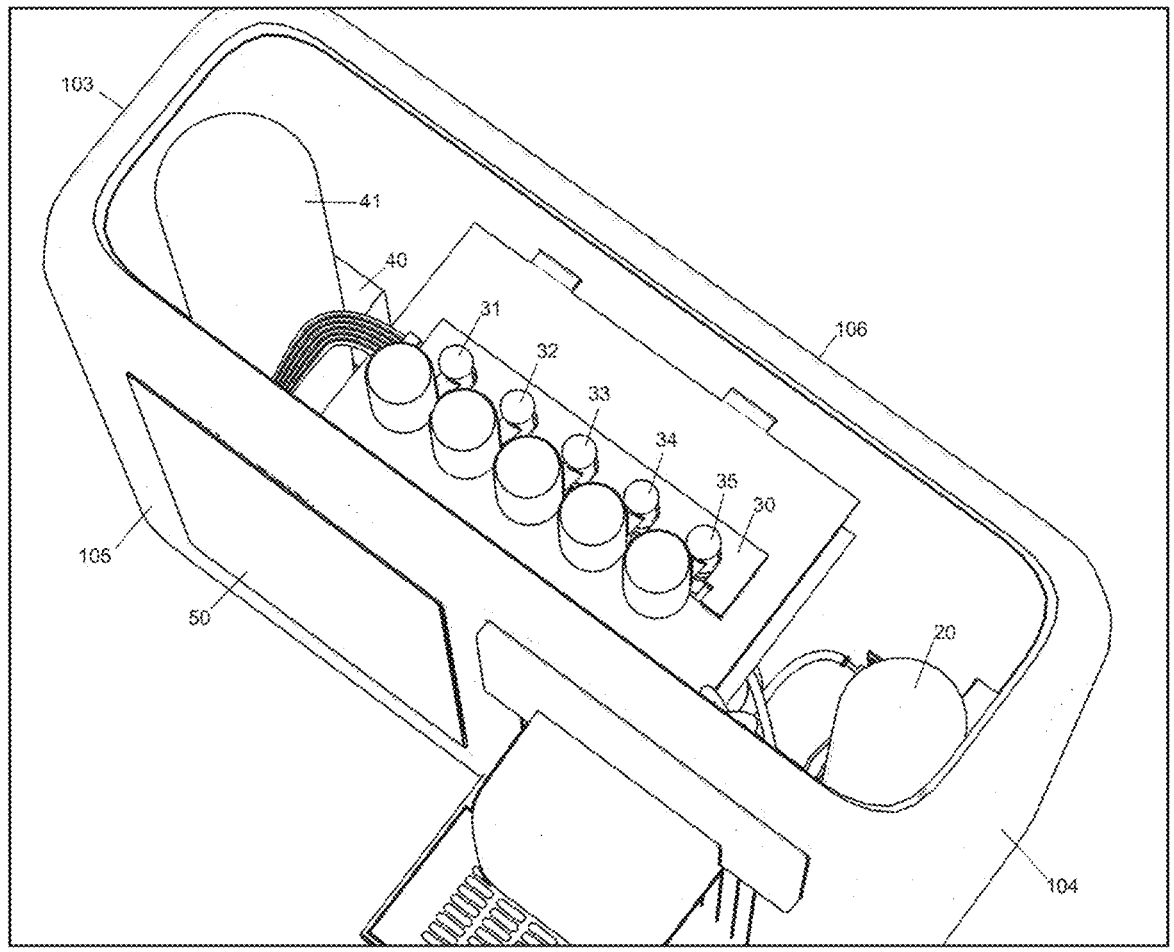
FIG. 3 shows a top view of all modules in the beverage creation device of the present invention.
Figure 4:
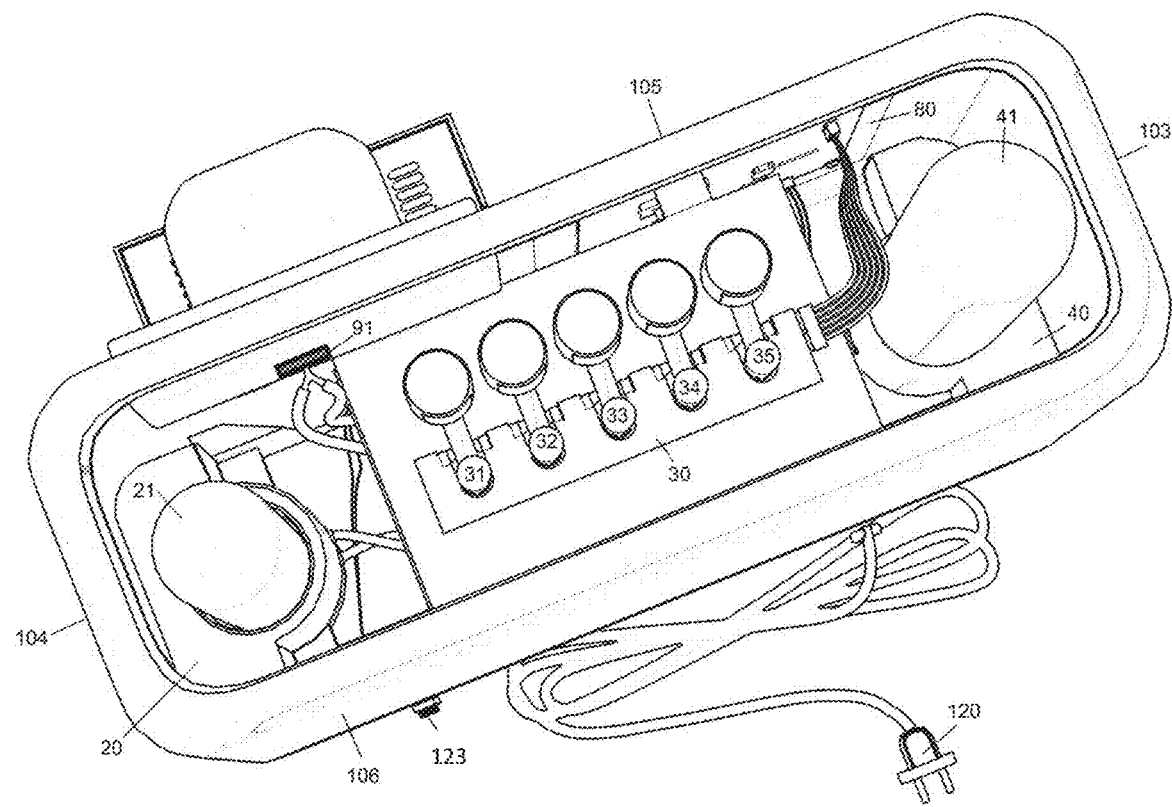
FIG. 4 shows a top view of all modules in the beverage creation device of the present invention.
Figure 5A:
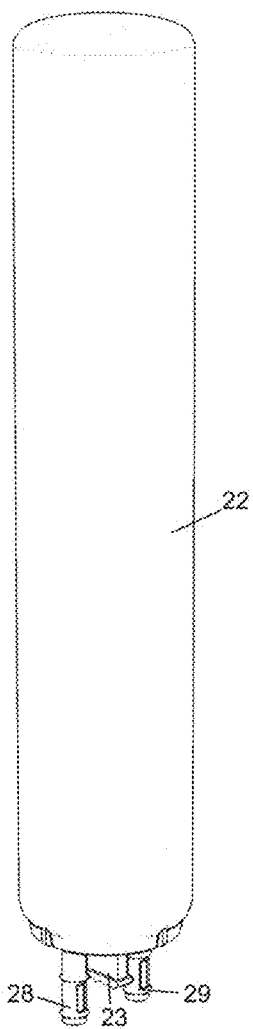
FIG. 5A shows a perspective view of the water filtration module of the present invention.
Figure 5B:
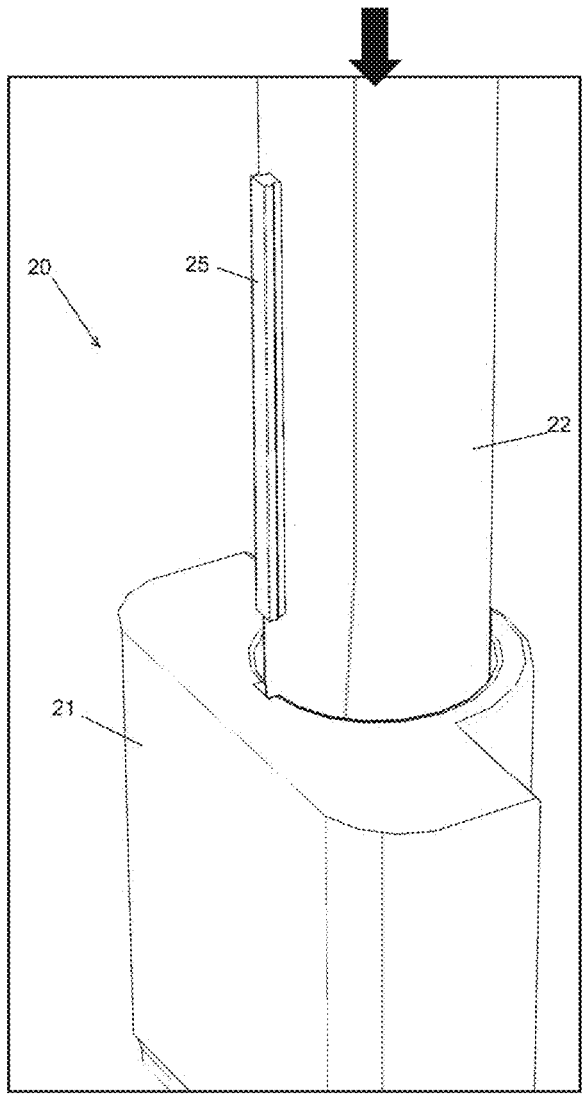
FIG. 5B shows a perspective view of the water cartridge and water filter of the present invention.
Figure 5C:
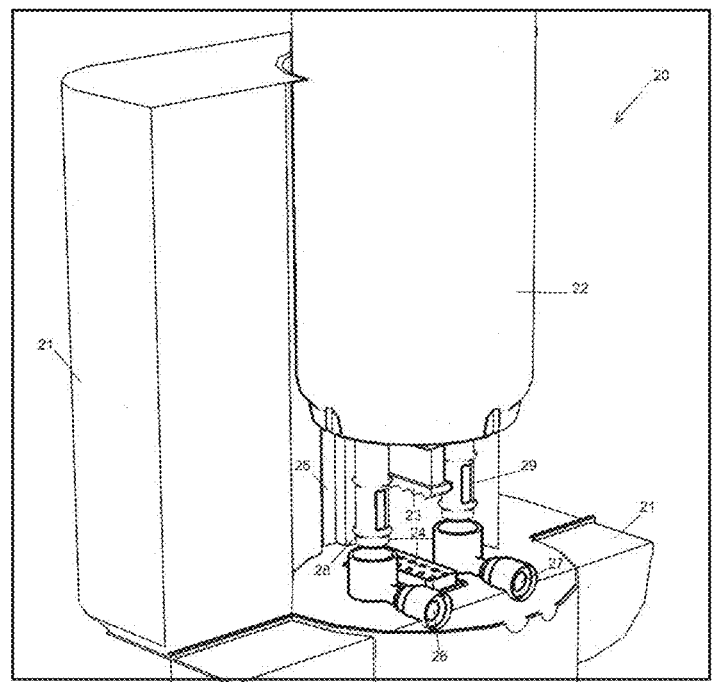
FIG. 5C shows a perspective close view of the water cartridge and water filter of the present invention.
Figure 5D:
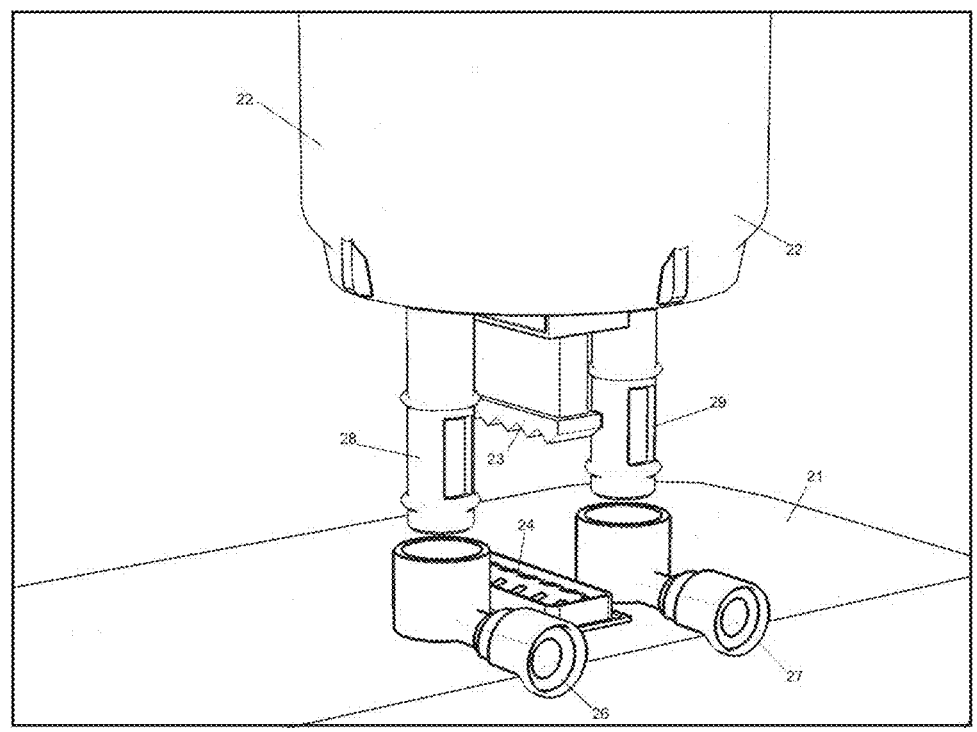
FIG. 5D shows a perspective close view of the water cartridge and water filter of the present invention.

As shown in FIGS. 2, 3 and 4 the beverage creation device 100 comprises of a water filtration module 20, a powder dispenser module 30 comprising of a plurality of powder dispensers 31-35, a water carbonated module 40, a pre-mixing chamber 60, a mixing chamber 70, a user interface 50 and a control panel 80.

Again as shown in FIGS. 2 to 5D, the water filtration module 20 has a water filter 22 that filters tab water and purifies the tab water from any chemicals, asbestos, particulates, lead and unhealthy contaminants. The water filter 22 is inserted into the cartridge 21 and is secured by a gripping mechanism 23-24. The user can push the water filter 22 inside the cartridge 21 by help of a railing mechanism 25. The process of replacement of the water filter 22 can be done by pushing down the top part of the water filter 22 to release the gripping mechanism 23-24.

Again, as shown in FIGS. 5A, 5B, 5C and 5D, the cartridge 21 has a water inlet port 26 and a water outlet port 27. The water inlet port 26 is connected to a water-inlet conduit 28 and the water outlet port 27 is connected to water-outlet conduit 29. Other design for the water filter and the way of connection to the cartridge can also be possible.

Again as shown in FIGS. 2, 5A-5D, the water filtration module 20 comprises of a filter cartridge 21 and a tier 1 water filter 22 that filters tab water and purifies the tab water. The water filtration module 20 has a water inlet valve 123 to connect to a tab water. The water inlet valve 123 regulates the water flow into the device 100. The process of filtration happens inside the tier 1 water filter 22. The tab water passes through the water inlet valve 123 into the water filter 22 and then goes to a pre-mixing chamber 60.

According to FIG. 2 a plurality of powder dispenser modules 31-35 are provided on the top part of the device to dispense minerals, vitamins and flavours. Each powder dispenser dispenses a quantitative amount of minerals, vitamins and flavours into the water based on user preferences and/or the doctor prescription.

The powder dispenser module 30 is designed at the top of the pre-mixing chamber 60 to dispense a quantitative amount of minerals and vitamins into the pre-mixing chamber 60. Based on the model of the beverage creation device 100, the number of powder dispenser module can be different. The process of dispensing of a powder into the pre-mixing chamber 60 is very crucial in the present invention.

As shown in FIGS. 2,7A-7E, the powder dispenser module 30 of the present invention comprises of a plurality of powder dispensers 31-35 to dispense a specific powder (vitamins, minerals, flavours or combinations of them). Each powder dispenser unit comprises of three compartments: a powder container, a powder chamber and a dispensing compartment. For example, the dispenser unit 31 comprises a powder container 320 powder chamber 330 and a dispensing compartment 340. The powder dispenser units 321, 322, 323 and 324 each have a powder container, a powder chamber and a dispensing compartment.

Figure 7A:
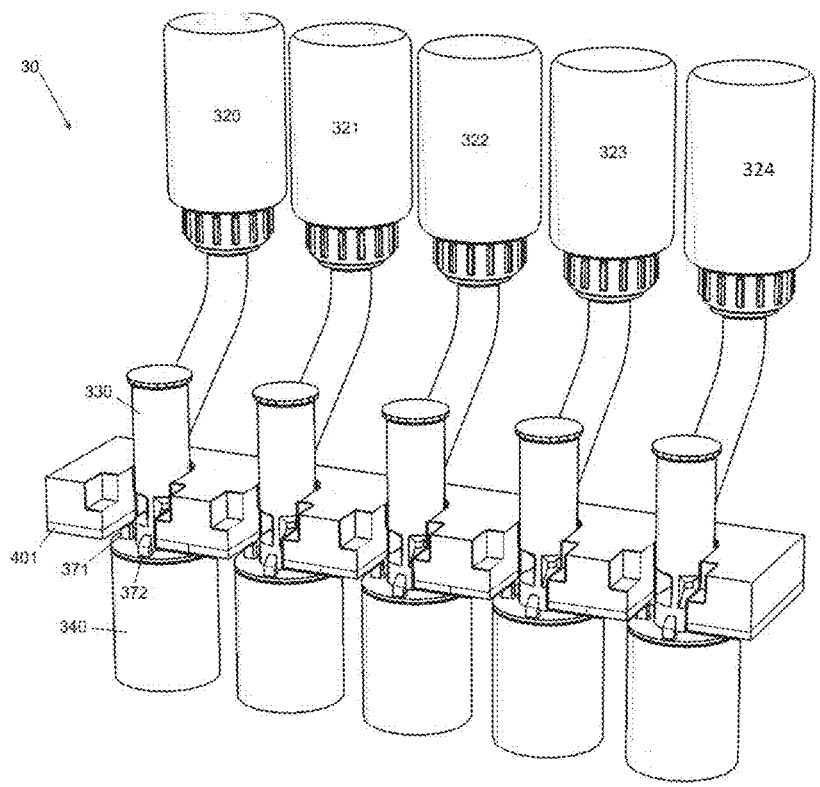
FIG. 7A shows a perspective view of a powder dispenser module according to the present invention.
Figure 7B:
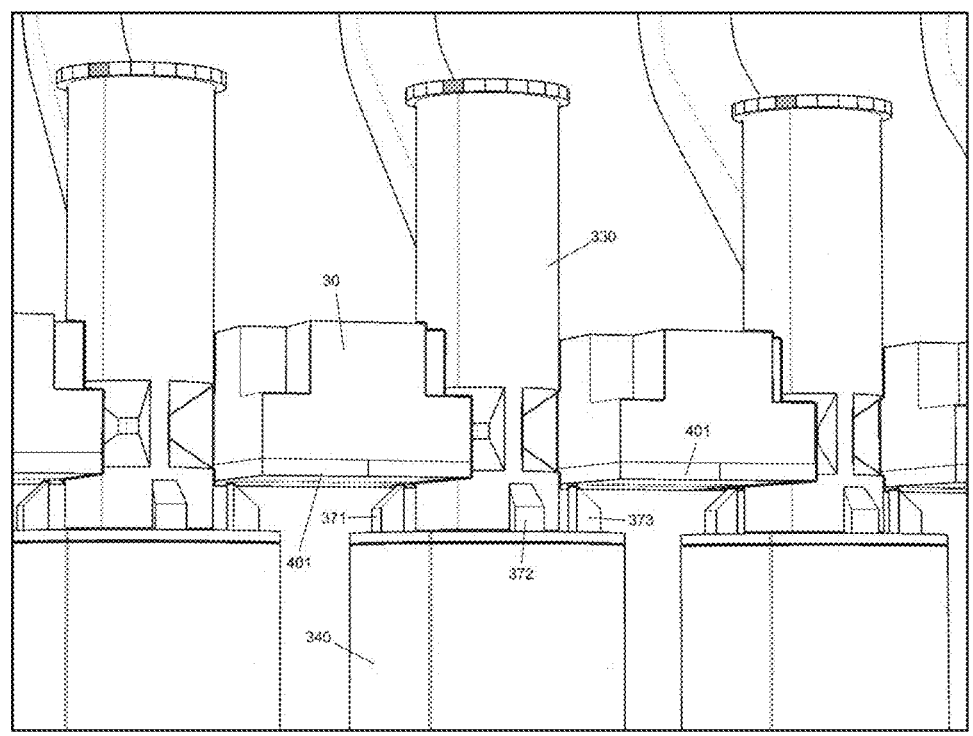
FIG. 7B shows a perspective front view of a powder dispenser module of the present invention.
Figure 7C:
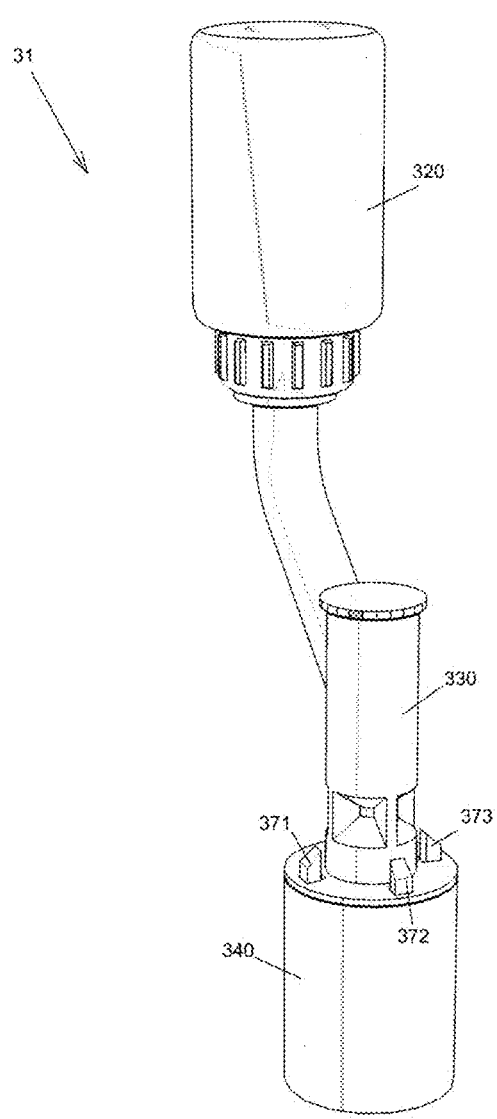
FIG. 7C is a perspective view of a powder dispenser showing the various parts according to the present invention.
Figure 7D:
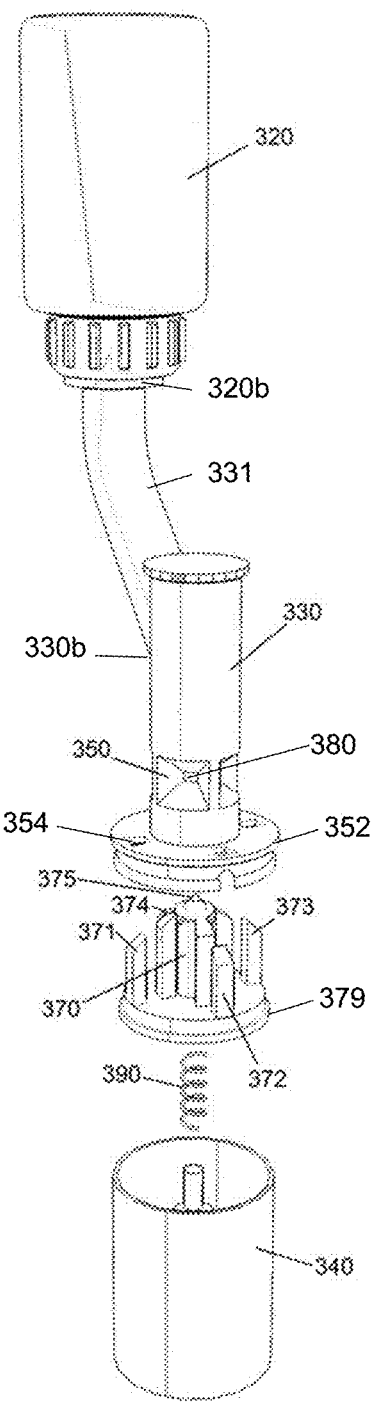
FIG. 7D shows an exploded view of a powder dispenser of the present invention.
Figure 7E:
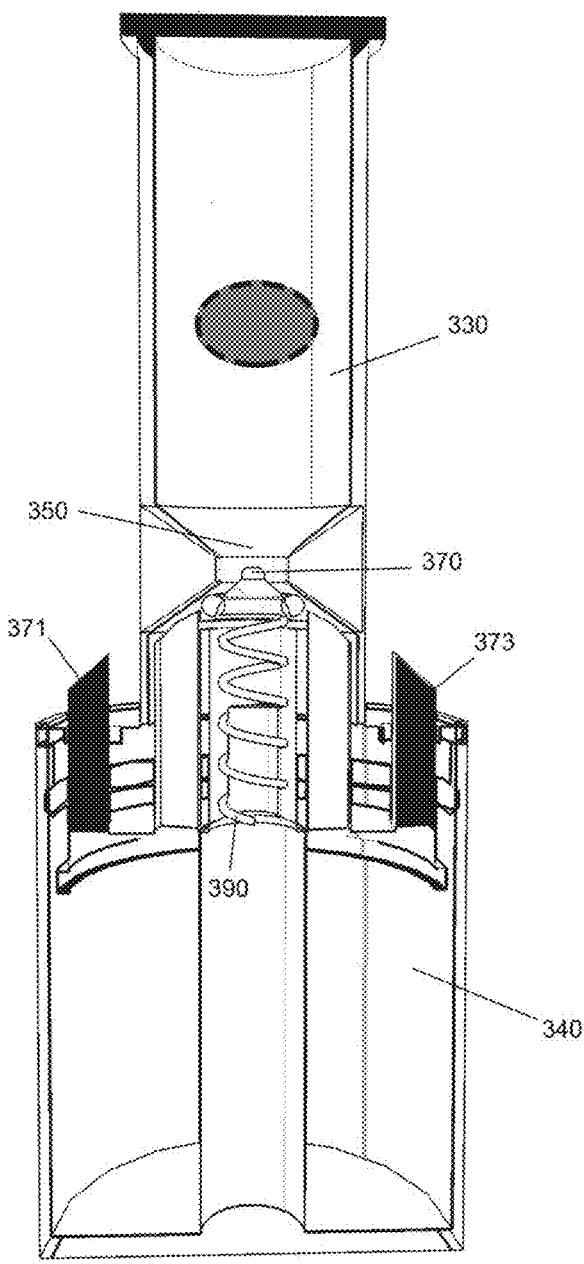
FIG. 7E shows a cross-section view of a powder dispenser of the present invention.

As clearly shown in FIGS. 7C and 7D the powder container 320 is connected to the powder chamber 330 from lateral side through a connecting tube 331 that connects the lower-side of the powder chamber 330b to the bottom 320b of the powder container 320. This allows to have a fixed amount of powder level in the powder chamber as the powder level reduces in the powder container. The powder chamber 330 has a hopper-shaped neck 350 and is connected to the dispensing compartment 340 by a valve 370. The bottom part of the powder chamber 330 has a sealing flange 352 that sealably attaches the powder chamber 330 to the dispensing container 340. A spring loaded bottom plate 379 is placed inside the dispensing compartment 340 that has a stopper rod (a valve) 370 at its center that is configured to sealable close the hopper opening 380, and a set of push-button elements 371-374 on its outer surface that pass through a set of apertures 354 of the sealable flange 352. By depressing the push-button-elements 371-374 by a miniature linear actuator 401 (shown in FIGS. 7A and 7B), the spring loaded bottom plate 379 is pushed down and thereby a top portion 375 of the valve 370 moves down and an orifice 380 on the neck 350 is opened. Each depression action in the push-button-elements 371-374 opens the orifice 380 for a specific time and returns to the first position by a spring 390 when released.

According to FIGS. 2, 7A to 7E again the whole structure of the powder dispenser 30 is connected to a vibrator mechanism to enhance the dispensing process. Each powder dispenser 31-35 is assigned and operated with a separate miniature linear actuator 401.

The size of the orifice 380, the diameter of the hopper-shaped neck 350, the duration of opening process in the powder dispensers 31-35 and the size, density and cohesion of a powder are important factors during the dispensing process. The surface of the pre-mixing area 330 and the valve 370 is coated by a hydrophobic coating to decrease surface friction and electrostatic charging of the powder's particle.

The diameter of the orifice 380 is between 1 to 5 mm, whereby the diameter is selected based on a powder characteristic, a hopper diameter and a duration of the opening process.

Each powder (vitamins, minerals, flavours and/or combinations) with its specific characteristic is tested to select a proper size of orifice 380, diameter of hopper-shaped neck 350 and the duration of opening process to dispense a quantitative amount of the powder.

When the size of orifice 380, diameter of hopper-shaped neck 350 and the duration of opening process are identified, the powder dispenser module can measure the amount of powder which dispenses into the dispensing chamber 340. For example, if each opening process dispenses 1 mg of a powder, so for measuring 6 mg of the powder, the valve should be opened for 6 times. Each powder dispenser 31-35 in the present invention can dispense very small amounts of a powder with great precision, speed, and reliability.

Figure 6A:
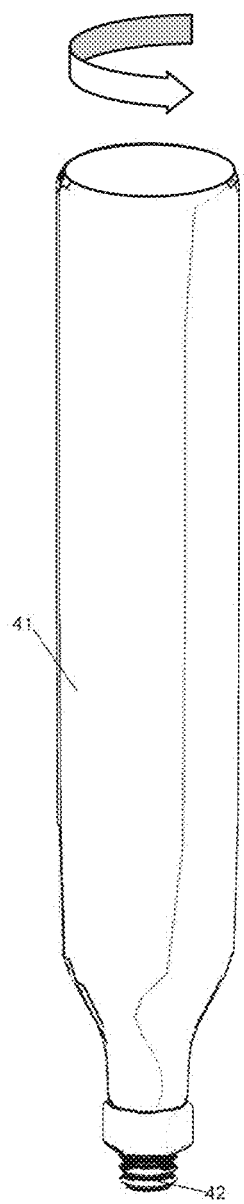
FIG. 6A shows a perspective view of the Coe carbonator cartridge of the water carbonated module according to the present invention.
Figure 6B:
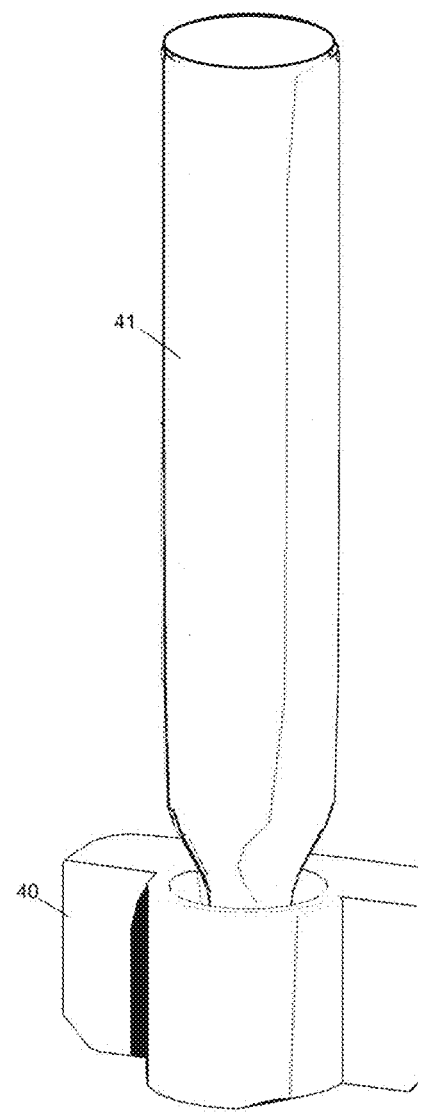
FIG. 6B shows a perspective view of the water carbonated module of the present invention.

Again, as shown in FIGS. 2, 6A and 6B, the beverage creation device 100 comprises of a water carbonated module 40 which carbonates the water and mix the minerals, vitamins and flavours into the water. The water carbonated module 40 has a $Co_2$ carbonator cartridge 41 which can be secured by a threaded head 42. The water carbonated module 40 carbonates water with pressurized gas and operates with an electrical controller and a safety valve to prevent damage from the pressurized gas when the electrical controller stops working during a carbonation process due to an electrical outage. The water carbonated module 40 comprises of a gas injector for injecting gas from the carbonator cartridge 41 into the mixing chamber 70.

Referring to FIG. 2 again the mixing chamber 70 has a swirl nozzle 71 to provide a spiral path for the gas into the water to maximize the gas solution into the water. When all minerals, vitamins and flavours are dispensed into the pre-mixing chamber 60, the filtered water inters from the filtering module 20 into the pre-mixing chamber 60 from several nozzles 61-63 and moves the minerals, vitamins and flavours into the mixing chamber 70. When the amount of water reaches to a necessary point and a level of dispensing precision is achieved the carbonating process happens by entering carbonated gas from $Co_2$ carbonator cartridge 41 into the mixing chamber 70 through a swirl nozzle 71 to carbonate the water and mix and dissolve the minerals, vitamins and flavours.

According to FIG. 2 again in operation when a level of dispensing precision is achieved for the minerals, vitamins and flavors, it is dispensed into the pre-mixing chamber where it mixes with filtered water. Then the mixed beverage travels into the mixing chamber through several nozzles. Then the carbonated gas enters from $Co_2$ carbonator cartridge 41 into the mixing chamber 70 through a swirl nozzle 71 to carbonate the water and mixing and dissolving the minerals, vitamins and flavours.

Figure 1B:
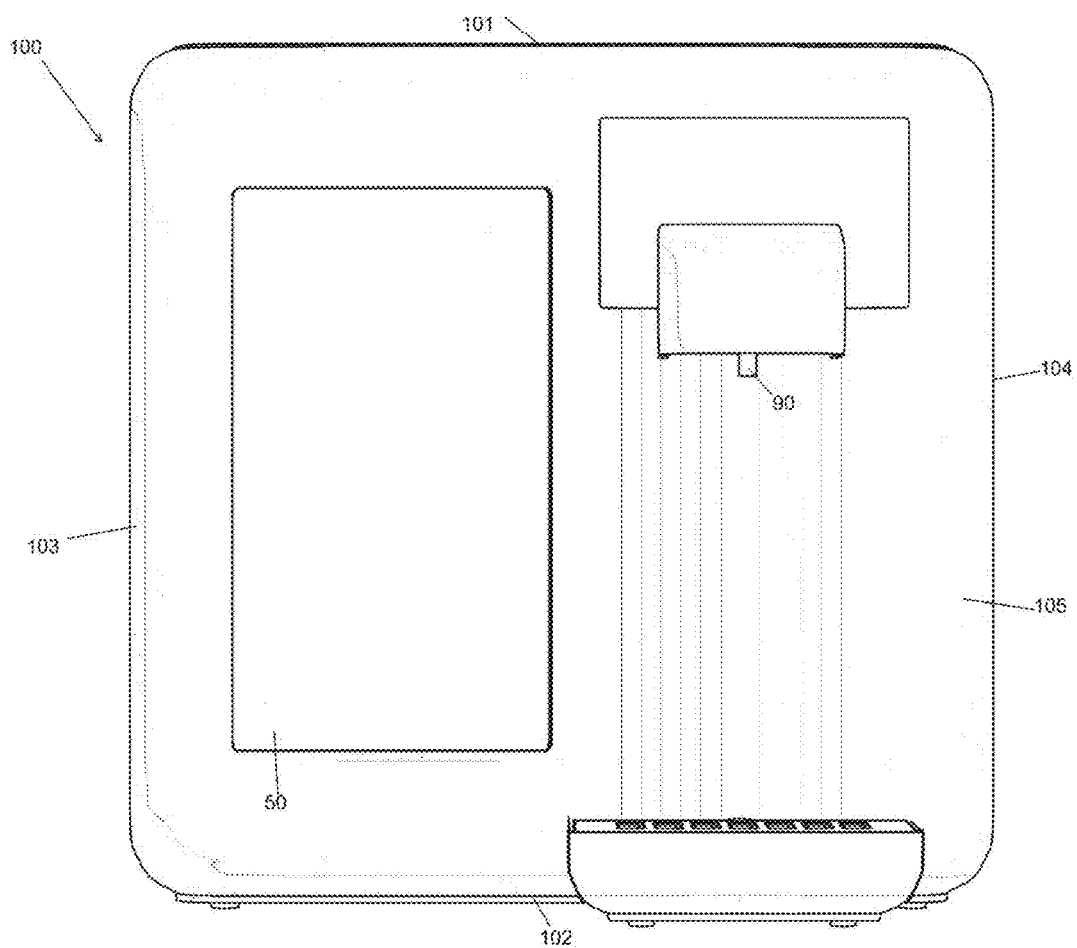
FIG. 1B shows a front view of the beverage creation device of the present invention.
Figure 1C:
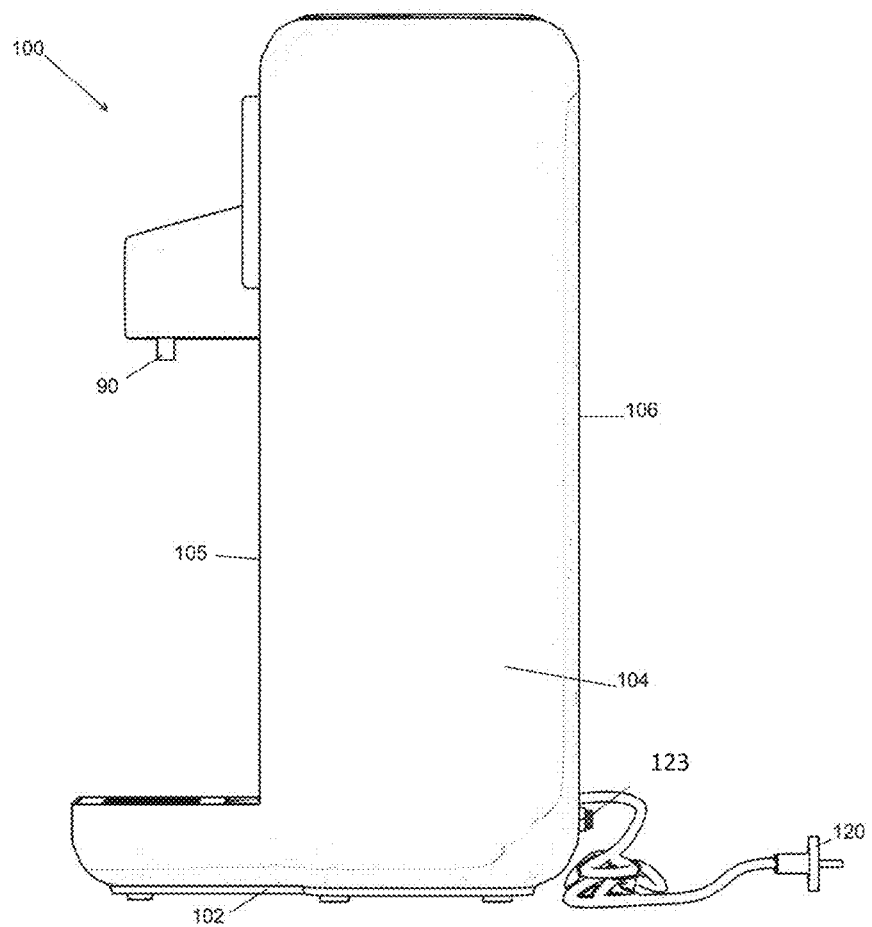
FIG. 1C shows a side view of the beverage creation device of the present invention.
Figure 1D:
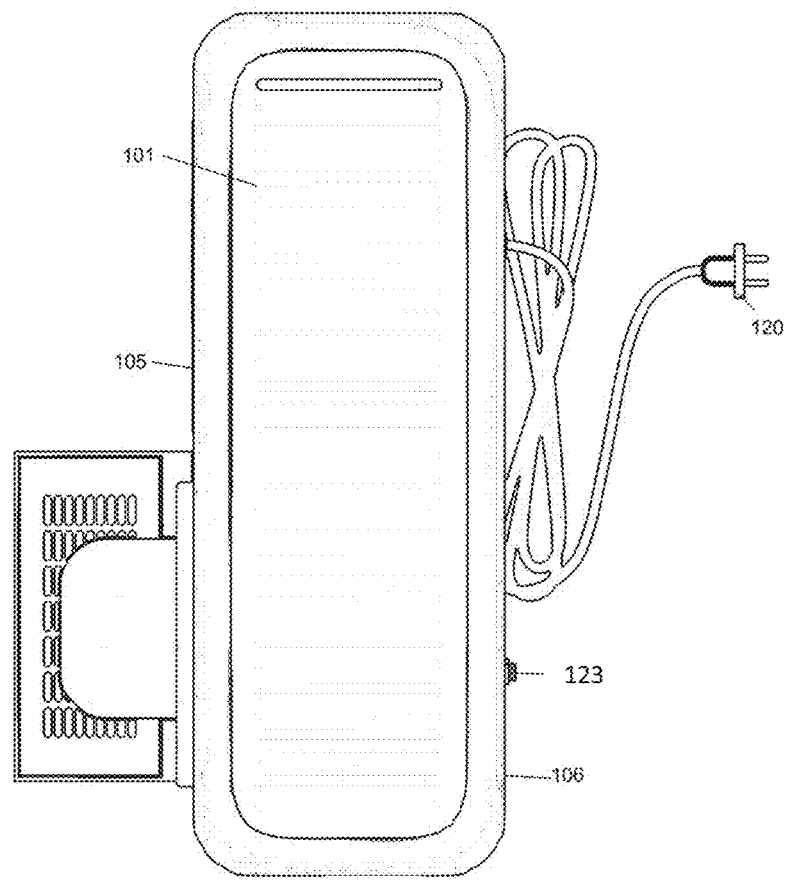
FIG. 1D shows a top view of the beverage creation device of the present invention.

Referring to FIGS. 1B and 1C the device has a nozzle 90 in front portion to dispense the beverage.

Figure 8:
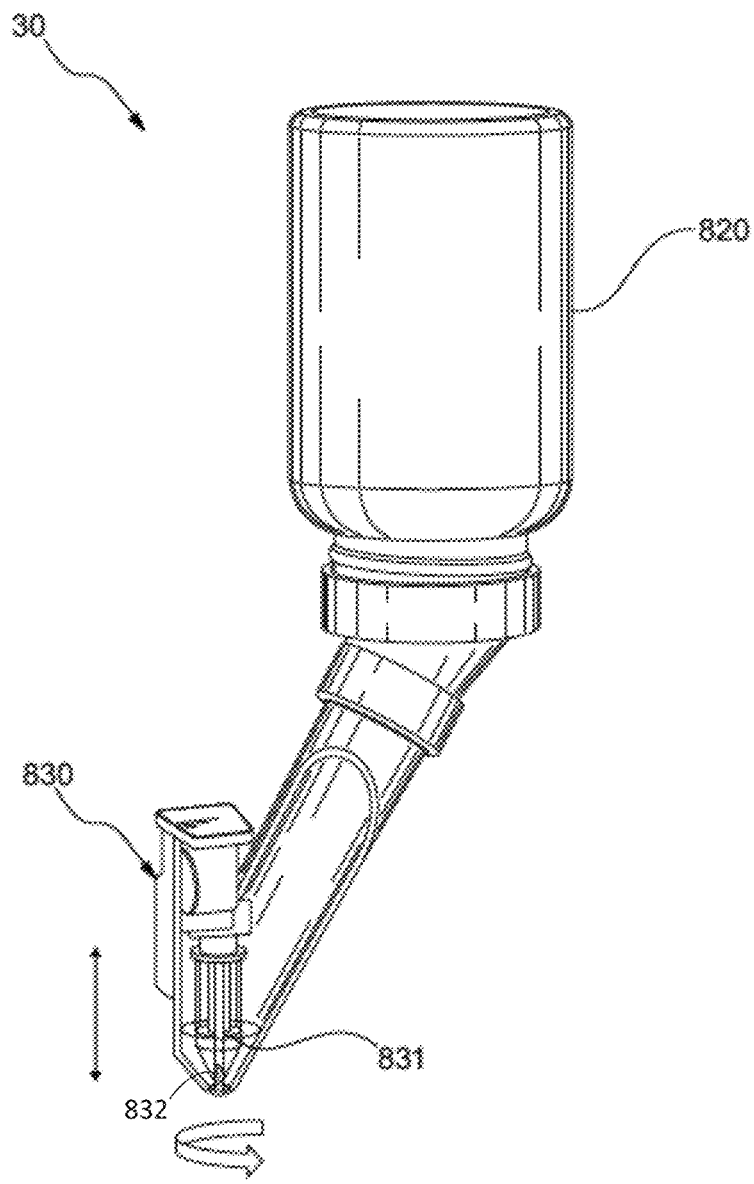
FIG. 8 shows a second embodiment of a powder dispenser with a dosing pin according to the present invention.
Figure 9:
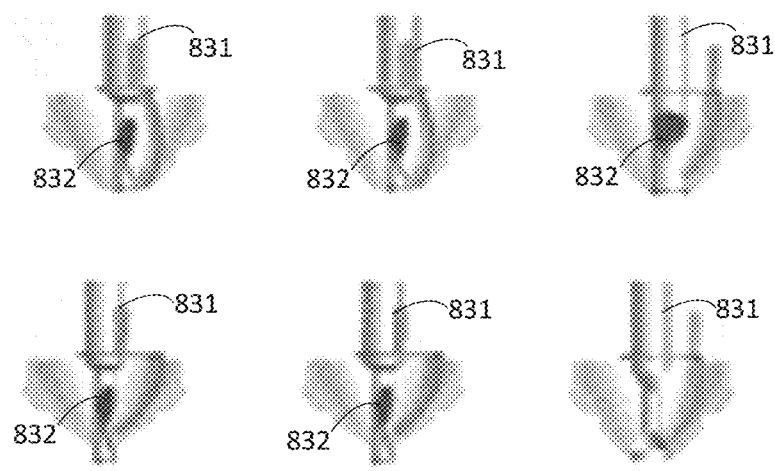
FIG. 9 shows different design of a dosing pin according to the present invention.

In another embodiment of the present invention as shown in FIGS. 8 and 9, the powder dispenser module has a dosing pin 830 instead of the valve. The dosing pin 830 is rotating and depressing into the dispensing compartment. The dosing pin comprises of a pushing stirrer 831 with a specific flute. The pushing stirrer 831 rotates and moves upwards and downwards. By each rotation of the dosing pin 831, the flute 832 on the bottom of the dosing pin 831 opens and a quantitative amount of the powder can be dispensed in the dispensing compartment (not shown). The dosing pin can be in different characteristic for dispensing different powder.

Figure 10C:
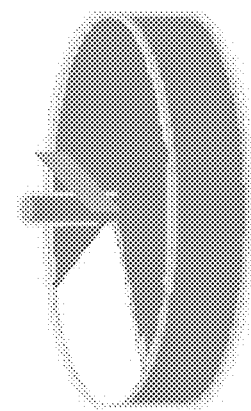
FIG. 10C shows a third embodiment of a powder dispenser according to the present invention.
Figure 10B:
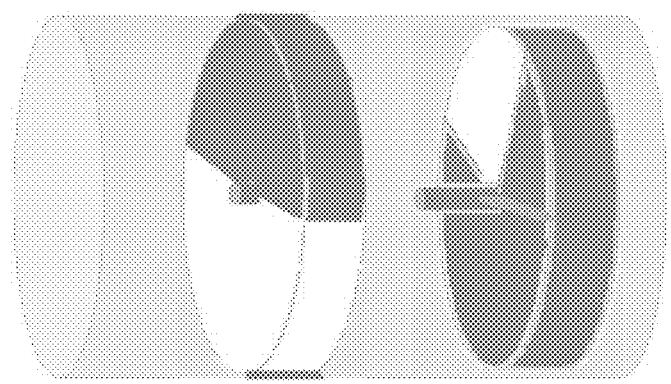
FIG. 10B shows a third embodiment of a powder dispenser according to the present invention.
Figure 10A:
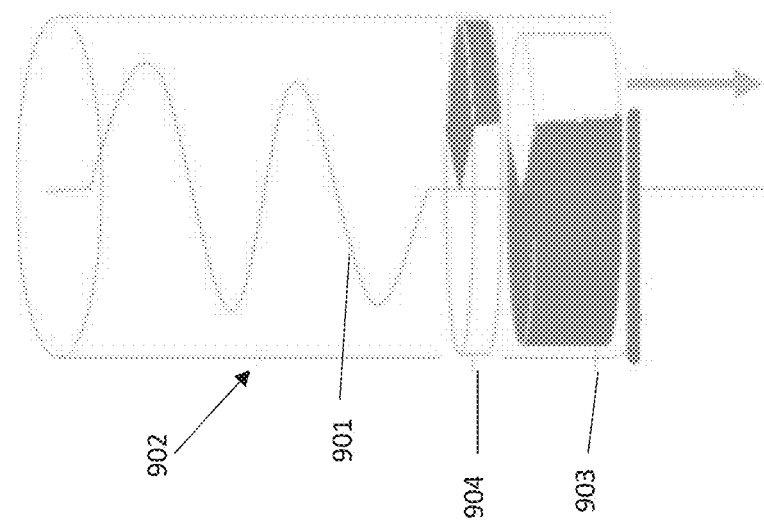
FIG. 10A shows a third embodiment of a powder dispenser according to the present invention.
Figure 11:
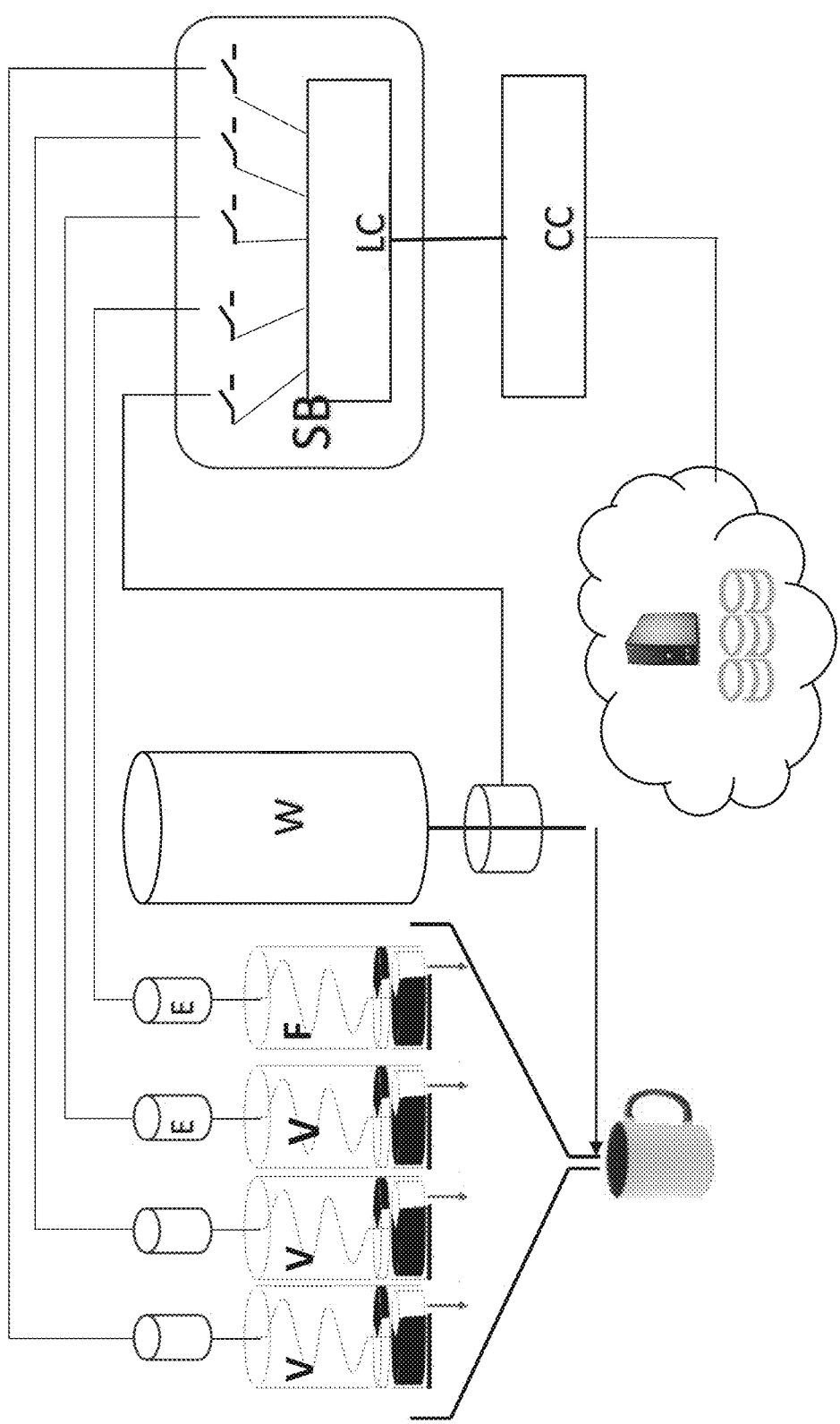
FIG. 11 shows a cloud storage and computing process of the third embodiment of the powder dispenser in the present invention and the whole device.

In another embodiment of the present invention as shown in FIG. 10A to 10C the powder dispenser has different design to facilitate the dispensing process. The powder dispensing module has a helical tape rod 901 in the powder mixing chamber 902. The mixing chamber includes a measuring plate 904. By rotating, the helical rod 901 mixes the ingredients inside the compartment and accurately measures a specific volume of the powder (dietary supplements, minerals, vitamins and flavours) and dispenses it into the measuring plate 904. The measured powder dispense into the dispensing compartment through an opening on one side of the bottom portion 903 of the mixing chamber 902.

In another embodiment of the present invention, a high accuracy digital scale can be used in the powder dispenser to scale each powder.

In another embodiment of the present invention, a plurality of water filter can be used in the device to filter the water to a desire level.

Referring to FIGS. 2 and 3, the present invention has a user interface 50 to manually or remotely select a specific amount of minerals, vitamins flavours and the degree of carbonated water. A control panel 80 is provided to track the daily usage of each consumer and notify the user to drink more water to supply the necessary supplements, check the combinations of the minerals and vitamins to make sure that they do not interfere with each other in each usage or in a specific period of time, prepare a report for each consumer for the amount of the consumed vitamins and minerals and modify the amount of supplements for the future usage.

Figure 12:
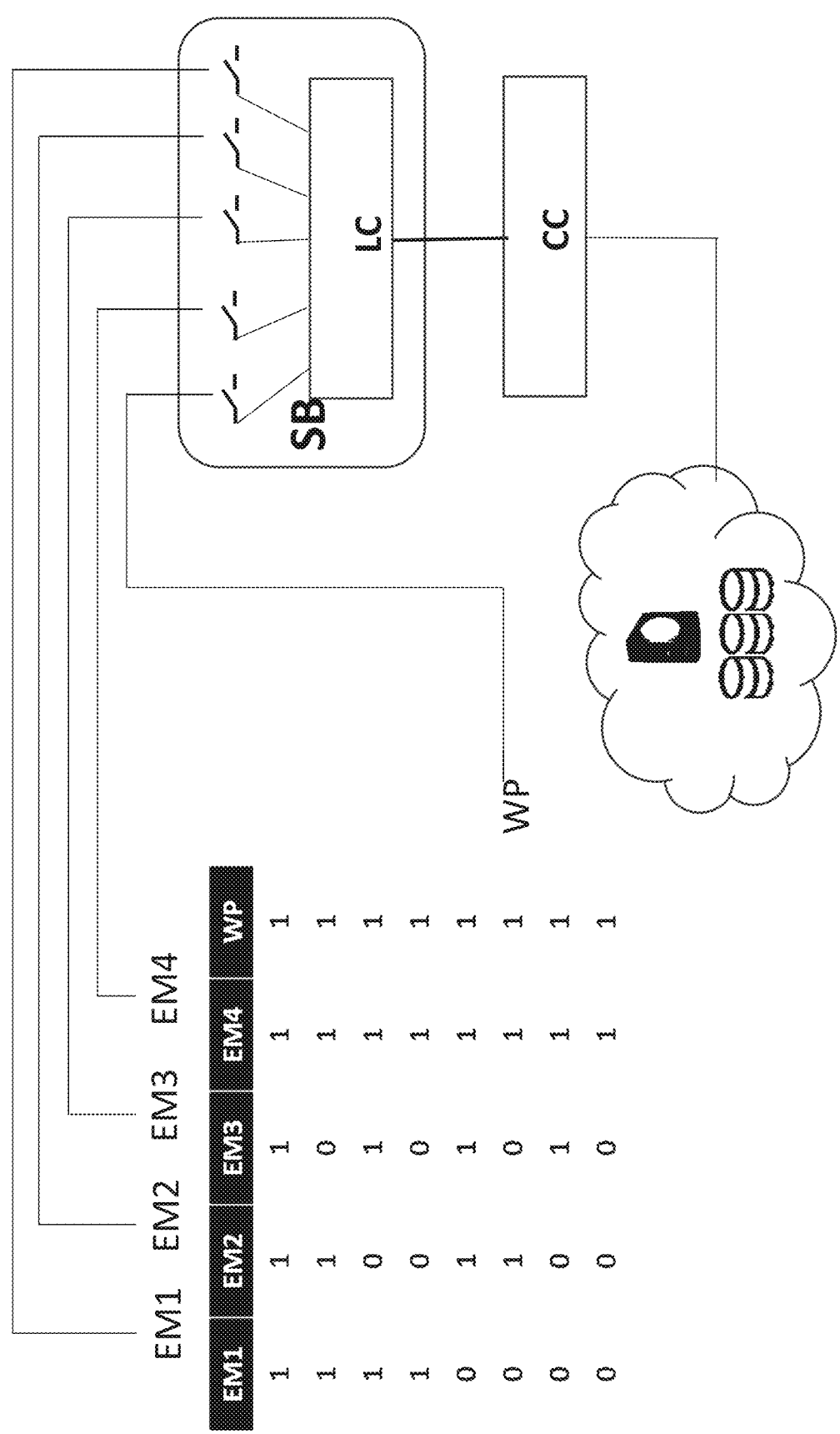
FIG. 12 shows the water dispenser in the present invention in different scenario.
Figure 13:
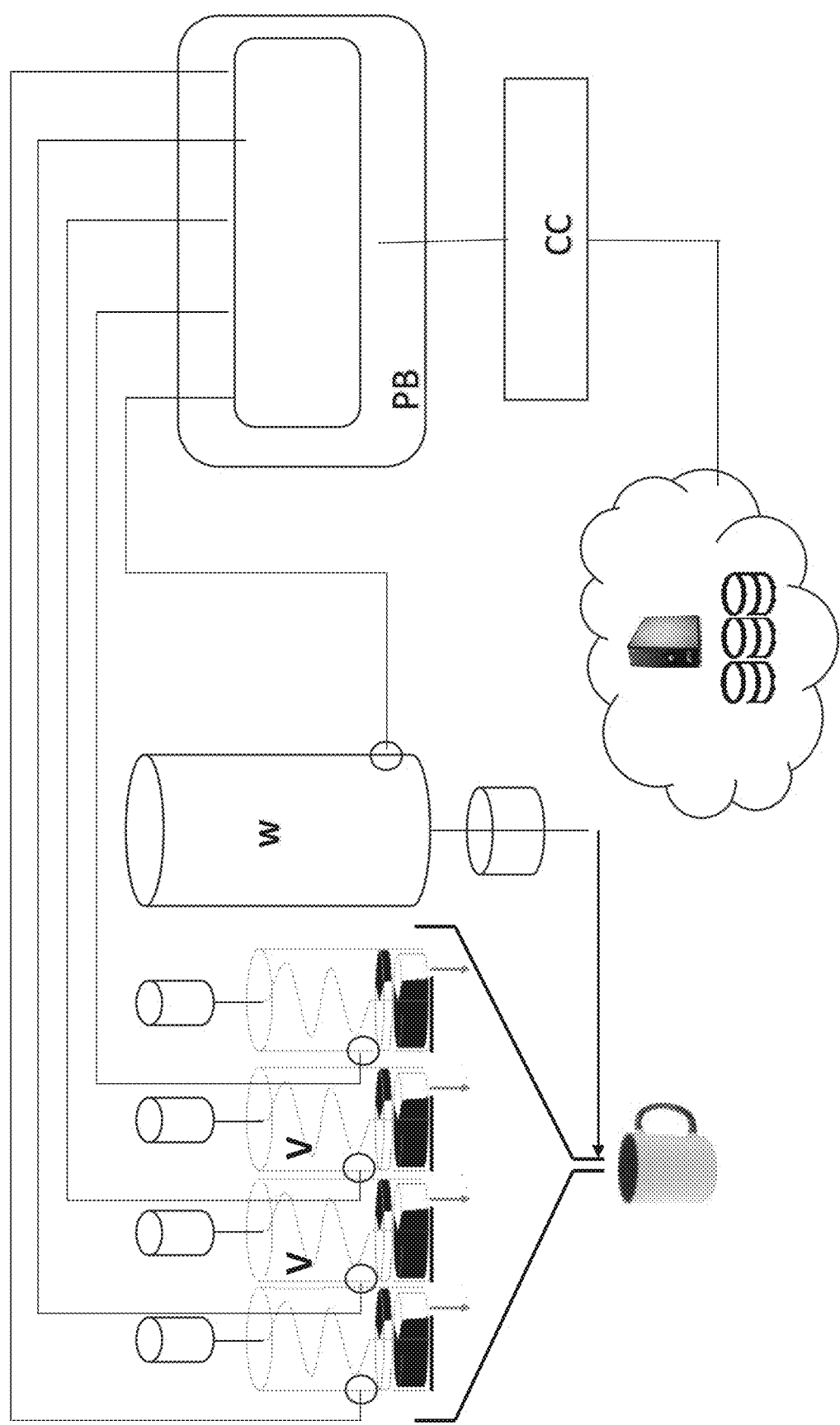
FIG. 13 shows the water dispenser in the present invention in different scenario.

In FIGS. 11 to 14 the water dispenser is shown in different scenario's. The user interface, the communication protocol, cloud storage and computing model and an example of a simple and generalized conceptual-relational diagram of the beverage creation system is disclosed. The system allows the inputs of patient information via user interface and ingredient substances to produce the beverage in the specified quantity. As shown in FIG. 12 every row indicates a defined scenario for using vitamins. Appropriately programmed software resides in various locations and it controls a plurality of dispensing mechanisms which are operationally integrated with each other.

In this case, each powder dispensing is manually placed in the device. Automated features include activating the powder dispensing to release powder therefrom. The user interface displays information such as a given patient's drug(s) and dosage. The system may include RFID chips to facilitate actuation or data storage. Other features could include algorithms for coordinating both hardware (e.g. means for changing or selecting drug(s) for each use, while avoiding cross-contamination; a multiplicity of dispensing mechanisms for each powder, and software to receive patient-specific information on dosage.

Figure 14:
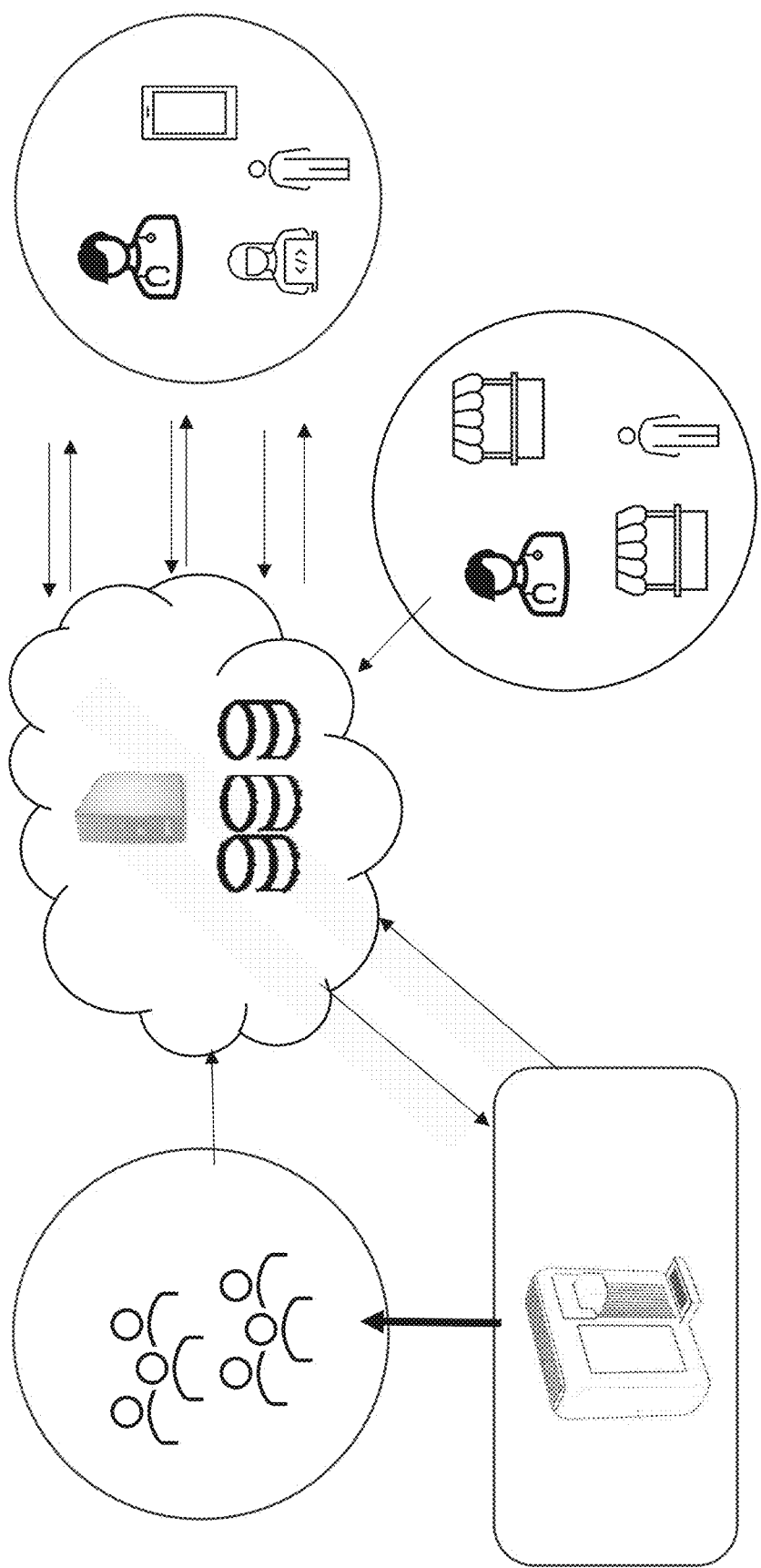
FIG. 14 shows a cloud storage and computing process according to the present invention.

FIG. 14 shows a cloud storage and computing process in the present invention. The user interface 50 may use for directly or indirectly entering prescription information integrated with the software operating the machine. Interface may be analog or digital, manual or automatic, hardware or software, etc. Alternatively, an integrated touch-screen on the device is an option. Countless sorts of such interfaces are readily feasible to suit any desired degree of sophistication, and the information they receive may vary depending on the extent of system automation.

As an additional safety and/or proprietary measure, source housing containers could be readable or recognizable by the system in order to enable it to ascertain d identity of each powder; currently adoptable options for achieving this include RFID tags, bar-coding, or direct-contact sensors. These electronic approaches, as well as mechanical fittings or the like, could also help to preclude connection or utilization of non-authorized drug source containers.

A preferred embodiment of the system and associated operating method comprises a predictive control algorithm to accomplish both very high speeds of dispensation as well as dynamic actuation adjustment to accommodate in real-time a wide range of powder/granule/bead properties or characteristics.

Again as shown in FIG. 1A, the user interface 50 is used to manually or remotely (by a mobile phone) select a user to customize the beverage with specific amount of minerals, vitamins and flavours and the degree of carbonated water.

The user interface 50 can be used for identifying the users in a household and customize the beverage based on their preferences or based on the prescription by a doctor. The control panel 80 can track the usage of each user and recommend the user to drink the water in a specific time of the day by appearing a message on the screen or sending a message to the user's mobile phone. The user can modify some portion of the formulation of the beverage such as flavour and degree of carbonation of the water or just drinking filtered water, or carbonated filtered water.

A microcontroller in the control panel 80 of the present invention controls sequence and coordination of events in the operation of the beverage creation device. The control panel has also a memory for retaining programs, user's profiles, the combinations of the recipes and tracking the usage of each user.

If the user wants to drink just a filtered water or combination of filtered water with carbonated water, the present invention can provide the requested water. The present invention can be connected to a handheld device like a mobile phone and communicates with the phone through a Bluetooth connection or Wi-Fi.

According to FIGS. 1A to 4 the device has an electric port 120 to provide power supply to the device.

In another embodiment of the present invention, the device has a mobile application to manage the profiles and track the beverage and water beverage for each user. The mobile application can provide daily, weekly, monthly and yearly report for each user based on their water consumption, the minerals and vitamins received by the help of the present invention. The mobile application also motivates the users to take minerals and vitamins through water during the day by sending notification and reminder to the user.

In another embodiment, the present invention further comprises of a tag reader to identify an object near the device for dispensing specific water infused with minerals and vitamins for a specific person. The tag reader can be equipped by RFID to recognize the object (i.e. a water bottle, a glass or any water container) to dispense the related amount of the minerals and vitamins.

The user interface 50 can be equipped with a tag reader to recognize the user and dispense a preferred beverage. The tag reader can read a tag carried by the user (RFID tag) or a barcode on a cup to identify the user.

In this way, if the present invention installed in a public space like an office, a factory or a mall, a user can easily order their preferred beverage by just coming close to the tag reader. The powder dispenser module of the present invention can be added to any water filter device in the market.

The number of powder dispenser module in the present invention can be variable based on the model of the device. The present invention comprises of a plurality of powder dispensers to dispense several minerals, vitamins, flavours and the combinations thereof.

The present invention has a capability to precisely measure the amount of the minerals and vitamins mentioned in the recommended dietary reference intake and add them to the water.

The present invention can be controlled by Alexa or Google Assistant (Google home) to prepare a beverage for a user by a voice command.

The present invention can be made in different combination and can be mounted on a stand or attached to a surface to provide a beverage for a plurality of users.

In another embodiment, the powder dispenser module can be equipped with a load cell to measure the amount of each dispensing powder. The function of the load cells can be combined by the present powder dispenser module.

In another embodiment, the mixing chamber can be equipped by a magnetic liquid mixer to enhance the mixture of the minerals, vitamins and flavours with water.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

With respect to the above description, it is to be realized that the optimum relationships for the parts of the invention in regard to size, shape, form, materials, function and manner of operation, assembly and use are deemed readily apparent and obvious to those skilled in the art, and all equivalent relationships to those illustrated in the drawings and described in the specification are intended to be encompassed by the present invention.

What is claimed is:

1. A beverage making device, comprising:
a housing defining a top part, a bottom part, two side walls, a front portion and a back portion, said top part is removable to access an inner space of the device; said housing comprising:
   a) a water supply module having a water inlet valve that connects to a tab water to regulate a water flow into a filtration module;
   b) a pre-mixing chamber to mix a set of powders of minerals, vitamins and flavours with a filtered water;
   c) a powder dispenser module having a set of powder dispensers placed above the pre-mixing chamber;
   d) each powder dispenser, comprising:
      i. a powder container feeding a powder chamber, wherein the powder chamber has a hopper that has an opening through which a predetermined amount of powder pours from the powder chamber to a dispensing compartment, and wherein the powder chamber has a sealing flange that sealably attaches the powder chamber to the dispensing compartment;
      ii. a connecting tube attached to a bottom opening of the powder container from a first end and to a lower-side of the powder chamber from a second end to keep a constant powder level in the powder chamber as the powder level reduces in the powder container;
      iii. a stopper mechanism placed inside the dispensing compartment to open and close the opening of the hopper, wherein the stopper mechanism comprising:
         a stopper rod extending upwardly from a center of a spring-loaded bottom plate to enter into and close the opening of the hopper;
         a set of push-rods placed symmetrically on and extending upwardly from a perimeter of the spring-loaded bottom plate and penetrate through a set of apertures on the periphery of the sealing flange of the powder chamber that are configured to receive the set of push-rods, and wherein when the opening of the hopper is closed by the stopper rod, the set of push-rods are extended out of the sealing flange;

a set of actuators to symmetrically push on the set of push-rods to open the opening and wherein the set of push-rods are symmetrical placed on the spring loaded bottom plate to prevent tilting of the bottom plate, whereby once the set of actuators are off, the spring-loaded bottom plate pushes the stopper rod upward to close the opening of the hopper; and e) a vibrator connected to the set of powder dispensers to facilitate powder flow in the hopper, and f) a controller to receive a set of inputs by a user wherein the set of inputs comprising of a desired daily amount of a set of powders.

2. The beverage making device of claim 1, wherein the opening has a diameter between 1 to 5 mm, whereby the diameter is selected based on a powder characteristic, a hopper diameter and a duration of an opening process.

3. The beverage making device of claim 1, wherein an inner surface of the pre-mixing chamber and the hopper is coated by a hydrophobic coating to decrease surface friction and electrostatic charging of the powder's particle.

4. The beverage making device of claim 1, wherein the water supply module further comprising a tier 1 water filter inserted into a filter cartridge.

5. The beverage making device of claim 1, further comprising a water carbonation module to carbonate the filtered water with a pressurized gas.

6. The beverage making device of claim 5, wherein the water carbonation module comprising of a mixing chamber having a swirl nozzle to provide a spiral path for the pressured gas into the water to maximize the pressured gas solution into the water.

7. The beverage making device of claim 5, wherein the controller further having a control switch to control the degree of carbonation by the user.

8. The beverage making device of claim 1, wherein the controller is configured to:
track a daily usage of the user and notifying the user to drink more water;
check the combinations of the minerals and vitamins to make sure that they do not interfere with each other in each usage or in a specific period of time, and
prepare a report for each user for the amount of the consumed vitamins and minerals.

9. The beverage making device of claim 1, wherein the controller has a memory for retaining programs, user's profiles, the combinations of the recipes and tracking the usage of each user and storing the information about the amount of vitamins, minerals which the user should take during a day.

10. The beverage making device of claim 1, wherein the device further has a tag reader to read a tag of an object for dispensing the related amount of water infused with minerals and vitamins.

* * * * *